US012688299B2

(12) United States Patent
Hulick et al.

(10) Patent No.: US 12,688,299 B2
(45) Date of Patent: Jul. 21, 2026

(54) SOFTWARE BILL OF MATERIALS RISK ASSESSMENT BASED ON VULNERABILITY AND REMEDIATION HISTORY

(71) Applicant: Cisco Technology, Inc., San Jose, CA (US)

(72) Inventors: Ted Hulick, Pearland, TX (US); Thomas Szigeti, Vancouver (CA); David J. Zacks, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 333 days.

(21) Appl. No.: 18/442,564

(22) Filed: Feb. 15, 2024

(65) Prior Publication Data

US 2025/0265346 A1     Aug. 21, 2025

(51) Int. Cl.
  *G06F 21/57*          (2013.01)
(52) U.S. Cl.
  CPC ................................. *G06F 21/577* (2013.01)
(58) Field of Classification Search
  None
  See application file for complete search history.

(56) References Cited

U.S. PATENT DOCUMENTS

| | | | |
|---|---|---|---|
| 2015/0172307 A1* | 6/2015 | Borohovski | ............ H04L 63/20 726/25 |
| 2017/0147338 A1* | 5/2017 | Jackson | .................... G06F 8/77 |

| | | | |
|---|---|---|---|
| 2020/0394310 A1* | 12/2020 | Sloane | ...................... G06F 8/65 |
| 2021/0374250 A1 | 12/2021 | Inagaki et al. | |
| 2022/0083652 A1 | 3/2022 | Ransford et al. | |
| 2023/0048088 A1 | 2/2023 | Landman | |

FOREIGN PATENT DOCUMENTS

| | | | | |
|---|---|---|---|---|
| CN | 115658128 A | 1/2023 | | |
| CN | 115906093 A | 4/2023 | | |
| WO | WO-2023023196 A2 * | 2/2023 | ............. | G06F 21/57 |

OTHER PUBLICATIONS

Zahan et al. entitled "Software Bills of Materials Are Required Are We There Yet?" (2023) (Year: 2023).*
Cvedetails.com, "New/Updated CVEs," CVE Security Vulnerability Database, Security Vulnerabilities, Exploits, References and More, retrieved from https://www.cvedetails.com, Feb. 9, 2024, 4 pages.

(Continued)

*Primary Examiner* — Paul R Fisher
(74) *Attorney, Agent, or Firm* — Edell, Shapiro & Finnan, LLC

(57) ABSTRACT

A method, computer system, and computer program product are provided for analyzing software applications for risk. Data is obtained indicating one or more components of an application and historical data relating to one or more previous versions of the application. The historical data is analyzed to identify one or more vulnerabilities present in the one or more previous versions of the application. A software bill of materials is generated for the application based on the one or more components of the application, wherein the software bill of materials includes risk metadata descriptive of the one or more vulnerabilities of the application. The risk metadata associated with the software bill of materials is analyzed to determine a risk score for the application.

20 Claims, 7 Drawing Sheets

300

| APPLICATION ID | LATEST VERSION | RISK SCORE | VULNERABILITY COUNT | AVERAGE REMEDIATION TIME | SOURCE |
|---|---|---|---|---|---|
| APP_01 | 1.2 | 5.5 | 7 | 7 DAYS | CLOSED |
| APP_02 | 1.5 | 2.0 | 3 | 2 DAYS | OPEN |
| APP_03 | 1.9 | 8.0 | 12 | 21 DAYS | CLOSED |
| APP_04 | 1.3 | 6.5 | 8 | 8 DAYS | CLOSED |
| APP_05 | 1.8 | 9.0 | 17 | 15 DAYS | OPEN |

302    304    306    308    310    312

(56)  References Cited

OTHER PUBLICATIONS

Dependency Track, "Reduce Supply Chain Risk Continuous SBOM Analysis Platform," retrieved from https:// dependencytrack.org/, Feb. 9, 2024, 8 pages.

Erdem, P., "SBOM and OWASP Dependency Track," retrieved from https://www.youtube.com/watch?v=uEpp-3q1tDg, Feb. 9, 2024, 2 pages.

Maven Repository, "Jackson Databind," retrieved from https:// mvnrepository.com/artifact/com.fasterxml.jackson.core/jackson-databind, Feb. 9, 2024, 10 pages.

National Vulnerability Database, "Vulnerabilities," Understanding Vulnerability Detail Pages, Vulnerability Statuses, retrieved from https://nvd.nist.gov/vuln, Feb. 9, 2024, 2 pages.

The White House, "Executive Order on Improving the Nation's Cybersecurity," Briefing Room, Presidential Actions, May 12, 2021, 23 pages.

\* cited by examiner

| APPLICATION ID | LATEST VERSION | RISK SCORE | VULNERABILITY COUNT | AVERAGE REMEDIATION TIME | SOURCE |
|---|---|---|---|---|---|
| APP_01 | 1.2 | 5.5 | 7 | 7 DAYS | CLOSED |
| APP_02 | 1.5 | 2.0 | 3 | 2 DAYS | OPEN |
| APP_03 | 1.9 | 8.0 | 12 | 21 DAYS | CLOSED |
| APP_04 | 1.3 | 6.5 | 8 | 8 DAYS | CLOSED |
| APP_05 | 1.8 | 9.0 | 17 | 15 DAYS | OPEN |

| APPLICATION ID | LATEST VERSION | RISK SCORE | VULNERABILITY COUNT | AVERAGE REMEDIATION TIME | SOURCE |
|---|---|---|---|---|---|
| APP_02 | 1.5 | 2.0 | 3 | 2 DAYS | OPEN |
| APP_01 | 1.2 | 5.5 | 7 | 7 DAYS | CLOSED |
| APP_04 | 1.3 | 6.5 | 8 | 8 DAYS | CLOSED |
| APP_03 | 1.9 | 8.0 | 12 | 21 DAYS | CLOSED |
| APP_05 | 1.8 | 9.0 | 17 | 15 DAYS | OPEN |

| VERSION | VULNERABILITIES |
|---|---|
| 2.13.5 | |
| 2.13.4.2 | |
| 2.13.4.1 | 1 VULNERABILITY |
| 2.13.4 | 1 VULNERABILITY |
| 2.13.3 | 2 VULNERABILITIES |
| 2.13.2.2 | 2 VULNERABILITIES |
| 2.13.2.1 | 2 VULNERABILITIES |
| 2.13.2 | 3 VULNERABILITIES |
| 2.13.1 | 3 VULNERABILITIES |
| 2.13.0 | 4 VULNERABILITIES |
| 2.13.0-rc2 | |
| 2.13.0-rc1 | |
| 2.12.7.1 | |
| 2.12.7 | 2 VULNERABILITIES |
| 2.12.6.1 | 2 VULNERABILITIES |
| 2.12.6 | 4 VULNERABILITIES |
| 2.12.5 | 4 VULNERABILITIES |
| 2.12.4 | 4 VULNERABILITIES |
| 2.12.3 | 4 VULNERABILITIES |
| 2.12.1 | 4 VULNERABILITIES |
| 2.12.0 | 4 VULNERABILITIES |
| 2.12.0-rc2 | 4 VULNERABILITIES |

402 — VERSION column

404 — VULNERABILITIES column

400

2.13.x (rows 2.13.5 through 2.12.7.1)

2.12.x (rows 2.12.7 through 2.12.0-rc2)

CONTROL
LOGIC

614

I/O

I/O

610

NETWORK
PROCESSOR
UNIT(s)

I/O

612

608

606

STORAGE

604

MEMORY
ELEMENT(s)

602

PROCESSOR(s)

SOFTWARE BILL OF MATERIALS RISK ASSESSMENT BASED ON VULNERABILITY AND REMEDIATION HISTORY

TECHNICAL FIELD

The present disclosure relates generally to analyzing software applications for risk.

BACKGROUND

A Software Bill of Materials (SBOM) is a detailed list of components, dependencies, and other software elements that are used to build a particular piece of software. An SBOM provides a comprehensive inventory of all the software components within a system, including third-party libraries, open-source software, and proprietary code. One purpose of an SBOM is to enhance transparency and traceability in the software development and supply chain. SBOMs aid organizations and governments in understanding the composition of their software, identifying potential security vulnerabilities or licensing issues, and managing software assets more effectively.

BRIEF DESCRIPTION OF THE DRAWINGS

FIG. 1 is a block diagram depicting a network environment for analyzing software applications for risk, according to an example embodiment.

FIGS. 3A and 3B are diagrams depicting risk assessment tables, according to an example embodiment.

FIG. 4 is a diagram depicting a user interface that may present risks associated with a software application, according to an example embodiment.

DETAILED DESCRIPTION

Overview

Figure 2:
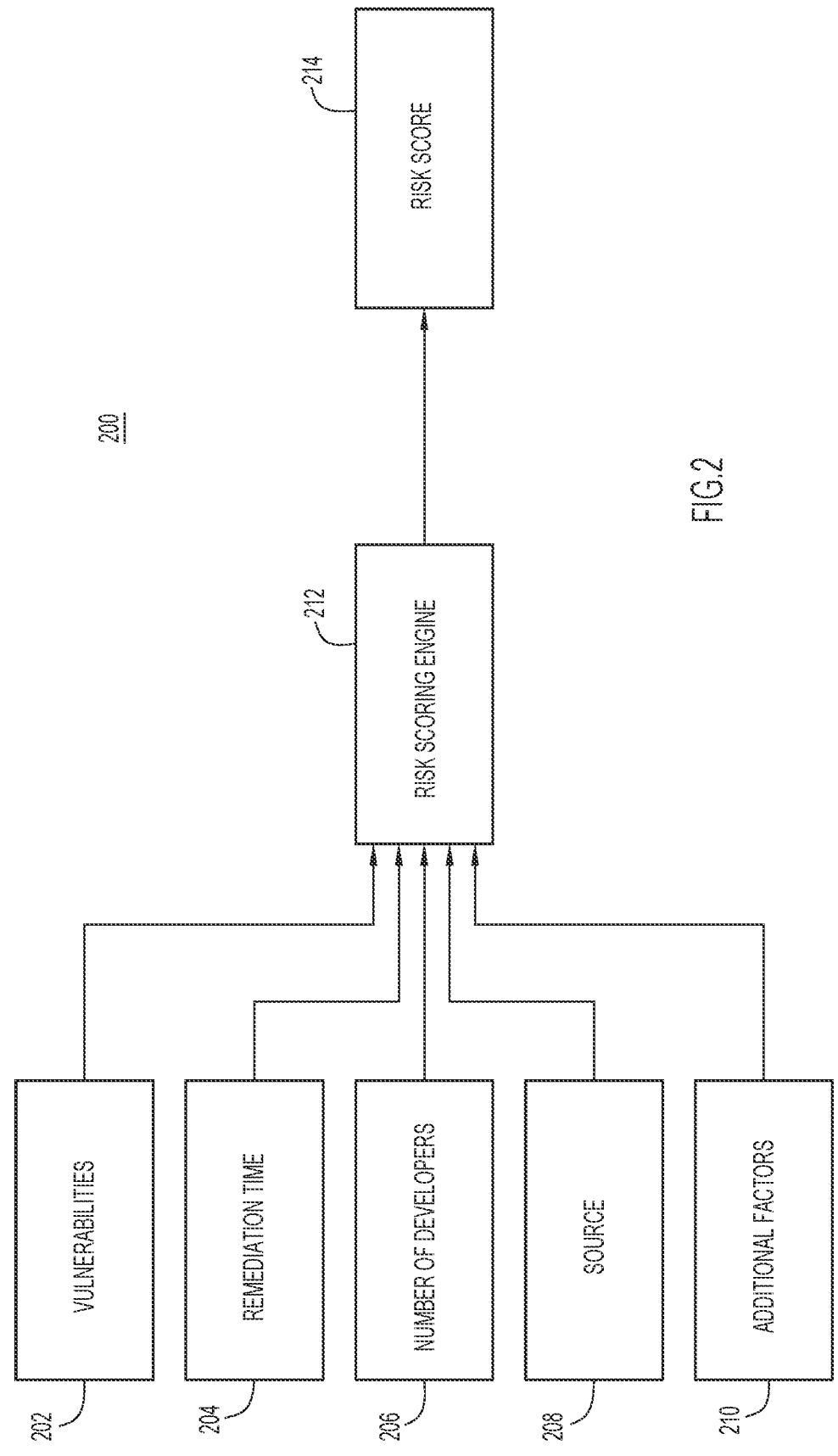
FIG. 2 is a flow diagram depicting a risk assessment for a software application, according to an example embodiment.

According to one embodiment, techniques are provided for analyzing software applications for risk. Data is obtained indicating one or more components of an application and historical data relating to one or more previous versions of the application. The historical data is analyzed to identify one or more vulnerabilities present in the one or more previous versions of the application. A software bill of materials is generated for the application based on the one or more components of the application, wherein the software bill of materials includes risk metadata descriptive of the one or more vulnerabilities of the application. The risk metadata associated with the software bill of materials is analyzed to determine a risk score for the application.

Example Embodiments

Present embodiments relate to analyzing software applications for risk, and more specifically, to assessing risk based on development history of applications. Recently, governments and other organizations have been requiring that software applications include software bills of materials (SBOMs) for cybersecurity purposes. Generally, SBOMs function as a listing of the components that make up an application, including any particular libraries that an application uses, application programming interface (API) calls, and/or other modules. Thus, when there is a known vulnerability in a component of an application, an enterprise can evaluate the application in terms of risk, and actions can be performed to mitigate or eliminate exposure to risk. For example, if an application includes API calls associated with a particular vulnerability, a different application may be used, or the application can be rolled back to a previous version that does not include the vulnerability, etc.

SBOMs can be used to assess the risk of an application by comparing each component listed in an SBOM to a list of components having known vulnerabilities. However, this approach to using SBOMs to assess risk fails to capture the historical context of an application with regard to risk. Rather, conventional assessments of risk using SBOMs only identify risks in current versions of applications. To address this problem, the embodiments presented herein provide an improved approach to using SBOMs for risk assessment by considering the history of an application. In particular, SBOMs corresponding to previous versions of applications can be analyzed to identify risk metrics for an application that include the frequency of vulnerabilities in previous versions of the application, the severity of those vulnerabilities, the time that developers took to remediate (e.g., patch) previous vulnerabilities, and the like. Thus, an application's history can be automatically analyzed to provide a holistic view of an enterprise's experience with an application, thereby enabling a total cost of ownership to be determined.

Thus, present embodiments improve the technical field of data security by enabling more-informed decisions to be made regarding applications in light of the historical context of those applications. Applications can be scored for risk in such a manner that enables applications to be ranked and automatically selected for deployment based on risk history. For example, if an enterprise chooses between using two or more applications, a particular application may be determined to be a best match based on how many vulnerabilities were present in previous versions of the application, whether the developers took too long to patch vulnerabilities, and the like. Present embodiments can provide a fully-automated approach to risk analysis and, consequently, application selection and deployment. Thus, present embodiments provide the practical application of reducing the total cost of ownership of applications, as well as providing the technical benefit of reducing future downtime, thus making for a more effective use of computing resources while also mitigating any potential exposures to risk (e.g., by reducing or eliminating the likelihood of security breaches).

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description, and appended claims, or may be learned by the practice of embodiments as set forth hereinafter.

Figure 1:
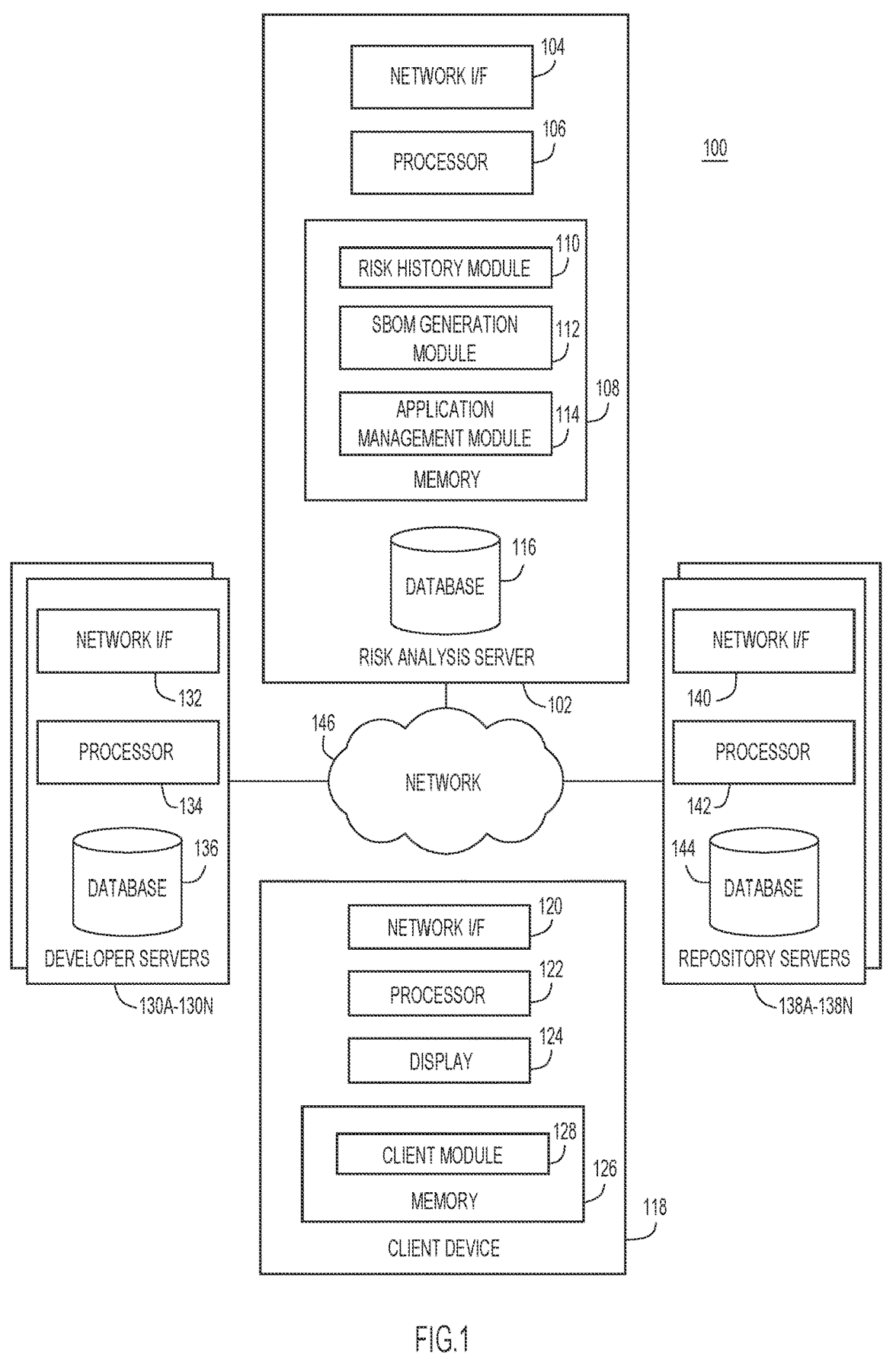

With reference now to FIG. 1, a block diagram is presented depicting a network environment 100 for analyzing software applications for risk, according to an example embodiment. As depicted, network environment 100 includes a risk analysis server 102, at least one client device 118, a plurality of developer servers 130A-130N, and a plurality of repository servers 138A-138N that are in communication via a network 146. It is to be understood that the functional division among components has been chosen for purposes of explaining various embodiments and is not to be construed as a limiting example.

Risk analysis server 102 includes a network interface (I/F) 104, at least one processor (computer processor) 106, memory 108 (which stores instructions for a risk history module 110, an SBOM generation module 112, and an application management module 114), and a database 116. In various embodiments, risk analysis server 102 may include a rack-mounted server, laptop, desktop, smartphone, tablet, or any other programmable electronic device capable of executing computer readable program instructions. Network interface 104 may be a network interface card that enables components of risk analysis server 102 to send and receive data over a network, such as network 146. Risk analysis server 102 and its components may be configured to analyze historical data that may be descriptive of risk in order to assess applications for risk in accordance with the embodiments presented herein.

Risk history module 110, SBOM generation module 112, and application management module 114 may include one or more modules or units to perform various functions of the embodiments described below. Risk history module 110, SBOM generation module 112, and application management module 114 may be implemented by any combination of any quantity of software and/or hardware modules or units, and may reside within memory 108 of risk analysis server 102 for execution by a processor, such as processor 106.

Risk history module 110 may obtain and analyze data that can be descriptive of the risk of an application in terms of the application's development history and/or other factors. As used herein, risk may refer to any current or future concerns with regard to an organization's usage of a particular application, including exposure to security threats, as well as other issues, such as an application's leading to network downtime or any other issues that impact networking or computing operations. The risk history module 110 may obtain data that may include any metadata that describes a particular application, and can be obtained from one or more network-accessible sources, including a server associated with a software development organization (e.g., developer servers 130A-130N), websites, and the like.

Furthermore, the risk history module 110 may obtain and analyze data that can include various data that is indicated with reference to versions of software applications. For a given software application, data can be obtained that describes a number of issues identified in each version of the software application, as well as other relevant qualitative and/or quantitative information about those issues. The data may be made available by developers or publishers of software, or can be published by researchers, such as software security investigators, governmental agencies, or other such persons or organizations. In some embodiments, the data is obtained from a system or systems that track Common Vulnerabilities and Exposures (CVE), which can include publicly-known information security vulnerabilities and exposures. One or more repositories (e.g., database 144 of repository servers 138A-138N, which is depicted and described with reference to FIG. 1) can store historical data regarding the identified vulnerabilities in each version of an application. Risk history module 110 may receive instructions to obtain data for a particular application and in response, search one or more network-accessible data stores for any relevant data for the application, including data for each version of the application.

The data related to application risk can include a number of vulnerabilities that have been identified with respect to each version of an application. In some embodiments, this data may include the versions of an application that are designated as official release versions, whereas in other embodiments, data for alpha or beta versions, etc., may additionally be included. Thus, the data can include a count of vulnerabilities for each version of an application. In some embodiments, the data can include a severity of each vulnerability. Vulnerabilities can be scored with respect to severity using a designation such as "low", "medium", or "high", or vulnerabilities can be scored with respect to severity using other ranges of values. In some embodiments, the severity score considers factors such as exploitability (e.g., complexity) and impact to assign a numerical value. Exploitability may refer to how easily accessible a vulnerability is to nefarious users, as some vulnerabilities may require a greater deal of subject matter expertise to successfully exploit. Impact may refer to a number of systems or devices affected by the vulnerability. The risk history module 110 may identify vulnerabilities that obtained from a CVE listing, which can be provided or made available by one or more third parties at one or more network-accessible locations.

In some embodiments, the risk history module 110 analyzes data related to an amount of time that a software developer takes to remediate one or more vulnerabilities in an application. The time between identifying and remediating vulnerabilities can be indicative of the sophistication, team size, or responsiveness of a developer, as well as other organizational practices. The time to remediate vulnerabilities corresponds to risk, as a longer duration of time to remediate a vulnerability may suggest that an enterprise using that application is exposed to risk for a longer period of time, or the developer team lacks sufficient skills to timely remediate an issue. In some embodiments, the time between identifying and remediating vulnerabilities can be measured from a point at which a vulnerability became publicly-known, whereas in other embodiments, the time may be measured from a point of the earliest-known zero-day exploit (which would necessarily not be publicly-available at the time, but may later become known by a software developer or other researchers).

In some embodiments, the data that is descriptive of risk may include a number of developers assigned to remediating past or present vulnerabilities. This number may be different for each version of an application, as a software development team may change in size over time. In some embodiments, the data that is descriptive of risk may include an indication of whether an application is open-source or closed-source. The open-source or closed-source nature of an application may be a useful consideration when evaluating for risk because open-source applications can potentially receive assistance in identifying and remediating vulnerabilities from a community at large, whereas closed-source applications may only be remediated by a development team that has access to the relevant proprietary information (e.g., source code, etc.).

Risk history module 110 may organize the obtained data for one or more software applications into a repository (e.g., database 116). The data may be organized for each application and for each version of an application such that the repository can be queried to determine the number of vulnerabilities in each version of an application, the time to remediate each vulnerability, the number of developers assigned to identifying and/or remediating vulnerabilities for each version, and an indication of whether each version of the software was developed according to an open-source or closed-source model.

SBOM generation module 112 may generate SBOMs for applications that include metadata describing the risk of the applications. An application may have an SBOM that is generated for each version of the application, and each version's SBOM can include risk metadata that is specific for that version of the application. The risk metadata may include any data obtained by risk history module 110, such as the number of vulnerabilities identified and/or remediated, the time required to remediate each vulnerability, the number of developers assigned to identifying and/or remediating vulnerabilities for that version, and an indication of whether the version was developed according to an open-source or closed-source model.

SBOM generation module 112 may automatically generate SBOMs by implementing mechanisms such as dependency scanners, build tools, continuous integration/continuous deployment systems, software composition analysis platforms, and the like. Dependency scanners may scan software dependencies and generate SBOMs automatically by cataloging the dependencies included in an application. Likewise, build tools can include plugins or commands that can produce SBOMs as part of the build process. Continuous integration/continuous deployment systems can be configured to automatically generate SBOMs during the build or deployment process, and software composition analysis platforms may include features for generating and managing SBOMs. In some embodiments, the SBOMs are developed and thus automatically generated by another computing device (e.g., a developer device rather than risk analysis server 102); in such cases, SBOM generation module 112 may obtain the SBOMs and modify the SBOMs to include the risk metadata in order to generate SBOMs that indicate risk in accordance with the embodiments presented herein.

Application management module 114 may manage a catalog of applications that are installed, or available for installation, on devices in a network. Additionally, application management module 114 can automatically select particular applications for installation to devices according to the risk posed by each application. For a given networking or computing role, there may be various software applications that are available to fulfill the requirements of an enterprise. Application management module 114 may obtain the SBOMs and associated risk metadata for each available option in order to analyze the risk data and automatically recommend a particular application based on a risk score.

Application management module 114 may generate a risk score for each application by processing the risk metadata associated with the SBOM for each version of the application. The risk factors that are analyzed when computing a score can include a count of vulnerabilities, a severity of vulnerabilities, a time between identifying and remediating vulnerabilities, a number of developers assigned to remediating past or present vulnerabilities in the application, and an open-source or closed-source status of the application. A set of predefined rules can be implemented that are used to assign a value for each risk factor, and an overall risk score can be computed by combining the values of each risk factor, which can be independently weighted to increase or decrease the influence of each risk factor on the overall risk score. A risk score can be computed overall for an application by analyzing the risk data for all versions of the application, or each version can be separately scored for risk and can be statistically combined by e.g., averaging the scores for each version. In some embodiments, older versions may be weighted such that those versions' risk has a lesser amount of influence over the overall risk score, as a developer's more recent practices may be deemed to be more relevant.

Using the risk scores determined for each application, application management module 114 can automatically perform various actions, including ranking applications according to risk, selecting particular applications with regard to the risk score of the applications, notifying users regarding the risk posed by applications, and/or automatically installing the applications at computing devices. In some embodiments, applications can be presented to a user via a user interface that indicates the risk for each aspect of an application, which can be presented at any level of granularity, including presenting an assessment of risk for an application overall, or an assessment for each version of the application. In some embodiments, application management module 114 can rank applications according to their risk scores; optionally, a lowest-risk application (i.e., according to its risk score) can be recommended to a user or automatically selected for installation. In some embodiments, application management module 114 can compare risk scores of applications to a threshold value, which can be a predetermined value that is defined for one or more network or computing devices. If an application satisfies the threshold value, then application management module 114 can notify a user that the application satisfies the threshold value, or the application may automatically be installed. In some embodiments, applications that are currently installed can be assessed for risk, and if an installed application's risk score fails to satisfy the threshold value (e.g., in light of new risk data regarding the application), then the application may be uninstalled and/or a network administrator may be notified. Similarly, if another application is identified whose risk score indicates that the application poses less risk than a currently-installed application, the less-risky application may be automatically installed and/or a network administrator can be notified.

Database 116 may include any non-volatile storage media known in the art. For example, database 116 can be implemented with a tape library, optical library, one or more independent hard disk drives, or multiple hard disk drives in a redundant array of independent disks (RAID). Similarly, data in database 116 may conform to any suitable storage architecture known in the art, such as a file, a relational database, an object-oriented database, and/or one or more tables. Database 116 may store data including SBOMs for various applications and associated risk metadata.

Client device 118 may include a network interface (I/F) 120, at least one processor (computer processor) 122, a display 124, and memory 126 (which stores instructions for a client module 128). In various embodiments, client device 118 may include a rack-mounted server, laptop, desktop, smartphone, tablet, or any other programmable electronic device capable of executing computer readable program instructions. Network interface 120 enables components of client device 118 to send and receive data over a network, such as network 146. Display 124 may include any electronic device capable of presenting information in a visual form. For example, display 124 may be a liquid crystal display (LCD), a cathode ray tube (CRT) display, a light-emitting diode (LED) display, an electronic ink display, and the like. Client device 118 may enable a user to review applications that have been assessed in terms of risk in order to select particular applications for installation.

Client module 128 may include one or more modules or units to perform various functions of the embodiments described below. Client module 128 may be implemented by any combination of any quantity of software and/or hardware modules or units, and may reside within memory 126 of client device 118 for execution by a processor, such as processor 122. Client module 128 may present a listing of applications via display 124, and a user can interact with a user interface in order to sort applications by risk score. In some embodiments, client module 128 presents new information to display 124 based on user interactions, including additional details regarding the risk of applications. Thus, a user can navigate through a catalog of applications in order to view the historical risk associated with each application.

Developer servers 130A-130N may each include a network interface (I/F) 132, at least one processor (computer processor) 134, and a database 136. In various embodiments, developer servers 130A-130N may each include a rack-mounted server, laptop, desktop, smartphone, tablet, or any other programmable electronic device capable of executing computer readable program instructions. Network interface 132 may be a network interface card that enables components of each developer server 130A-130N to send and receive data over a network, such as network 146. Each developer server 130A-130N may be associated with a particular software developer, and may store software applications, risk data, and/or SBOMs in database 136. In particular, database 136 may include executable software applications that can be obtained, assessed for risk, and/or automatically installed in accordance with present embodiments. Risk analysis server 102 may access the developer servers 130A-130N to obtain data that is used to assess applications for risk, including SBOM data for various versions of applications and associated risk data.

Repository servers 138A-138N may each include a network interface (I/F) 140, at least one processor (computer processor) 142, and a database 144. In various embodiments, repository servers 138A-138N may each include a rack-mounted server, laptop, desktop, smartphone, tablet, or any other programmable electronic device capable of executing computer readable program instructions. Network interface 140 may be a network interface card that enables components of each repository server 138A-138N to send and receive data over a network, such as network 146. Each repository server 138A-138N may be associated with a particular entity who investigates and/or reports vulnerabilities (e.g., CVEs), and may store data that is descriptive of vulnerabilities for various applications and versions thereof in database 144. Risk analysis server 102 may access the repository servers 138A-138N to obtain data that is used to assess applications for risk, including CVE data for various versions of applications.

Network 146 may include a local area network (LAN), a wide area network (WAN) such as the Internet, or a combination of the two, and includes wired, wireless, or fiber optic connections. In general, network 146 can be any combination of connections and protocols known in the art that will support communications between risk analysis server 102, client device 118, developer servers 130A-130N, and/or repository servers 138A-138N via their respective network interfaces in accordance with the described embodiments.

With reference now to FIG. 2, a flow diagram is provided depicting a risk assessment operational flow 200 to generate a risk score for a software application, according to an example embodiment. As depicted, operational flow 200 includes a risk scoring engine 212 which has inputs of vulnerabilities 202, remediation time 204, number of developers 206, source 208, and additional factors 210. The additional factors 210 may include use of encryption by the application, performance of the application, reputation of the developer of the application, anticipated support for the application (e.g., whether the application has a scheduled end-of-life), and the like. Risk scoring engine 212 outputs a risk score 214 based on an analysis of these factors. Risk scoring engine 212 may be implemented by application management module 114, as depicted and described with reference to FIG. 1.

The inputs of vulnerabilities 202, remediation time 204, number of developers 206, source 208, and additional factors 210 may be obtained from one or more network-accessible locations, such as a server associated with a developer of the software application being analyzed and/or third-party sources. In some embodiments, the inputs are obtained from risk metadata associated with SBOMs for each version of a software application. The number of vulnerabilities 202, remediation time 204, number of developers 206, source 208 (i.e., open-source vs. closed-source), and any other desired additional factors 210 can be analyzed by risk scoring engine 212 using a rules-based approach that assigns values to each input in order to determine the risk score 214 for a software application.

A higher vulnerability count, more-severe vulnerabilities, longer remediation times, lower numbers of developers, and/or a closed-source model may cause risk scoring engine 212 to output a risk score 214 indicating that an application has a higher risk given its history of development, whereas a lower vulnerability count, less-severe vulnerabilities, shorter remediation times, higher numbers of developers, and/or an open-source model may cause risk scoring engine 212 to output a risk score 214 indicative of lower risk. The information inputs 202-210 can be weighted so that some inputs have more influence over the resulting risk score 214.

In some embodiments, risk scoring engine 212 may include a machine learning model that is trained using a training set of example inputs and corresponding risk scores. The risk scores in the training data can be provided by one or more subject matter experts and can be values within a range (e.g., zero through ten) or a binary classification (e.g., "acceptable level of risk" vs. "unacceptable level of risk"). Thus, instead of using predefined scoring rules, the machine learning model can be trained to process the input data in order to determine risk scores 214.

FIGS. 3A and 3B are diagrams depicting risk assessment tables 300 and 350, according to an example embodiment. Each of the risk assessment tables 300 and 350 may be presented to a user via a user interface, which can be displayed by display 124 of client device 118, as depicted and described with reference to FIG. 1.

Referring to FIG. 3A, a risk assessment table 300 includes applications 302 ("App_01", "App_02", "App_03", "App_04", and "App_05") a version 304 for each application, a risk score 306 for each application, a vulnerability count 308 for each application, an average remediation time 310 for each application and a source 312 for each application. The vulnerability count 308 values may include a total number of vulnerabilities for all versions of each application, or a number of vulnerabilities over a selected time window (e.g., in the last six months, etc.) or number of version releases (e.g., in the last three releases, etc.). The values for the risk score 306 for each application can be determined in accordance with present embodiments, and can be based on the values for vulnerability count 308, average remediation time 310, and/or source 312.

With reference now to FIG. 3B, risk assessment table 350 includes the same applications 302 and corresponding values for version 304, risk score 306, vulnerability count 308, average remediation time 310, and source 312. In the depicted example, a higher risk score may indicate a higher level of risk posed by using a given application. Risk assessment table 350 may present the values as sorted by risk score 306. In the depicted example, App_02 has the lowest overall risk score, which can be because of the relatively low vulnerability count, average remediation time, and open-source nature of development. Next, App_01 may have a higher risk score due to having a higher vulnerability count, average remediation time, and closed-source development. App_04 may receive a higher risk score as compared to App_01 due to slightly higher vulnerability count and average remediation time values, and likewise, App_03 may have a higher risk score due to even higher values for the vulnerability count and average remediation time. Finally, App_05 may have a highest risk score value, despite being open source, due to the high values for vulnerability count and average remediation time. Thus, in the depicted example, a user may select App_02 for installation, or App_02 may be automatically installed.

With reference now to FIG. 4, a diagram is provided depicting a user interface 400, according to an example embodiment. As depicted, user interface 400 includes data for various versions of an application, including a version number 402 and vulnerability count 404. The versions can be grouped according to major releases (e.g., "2.13.x" and "2.12.x") with specific version numbers 402 and vulnerability counts as shown at 404. This data can be provided by a CVE tracker, and can be obtained for analysis in accordance with present embodiments by an application programming interface (API) that is configured to obtain vulnerability counts for each version of the software application.

Figure 5:
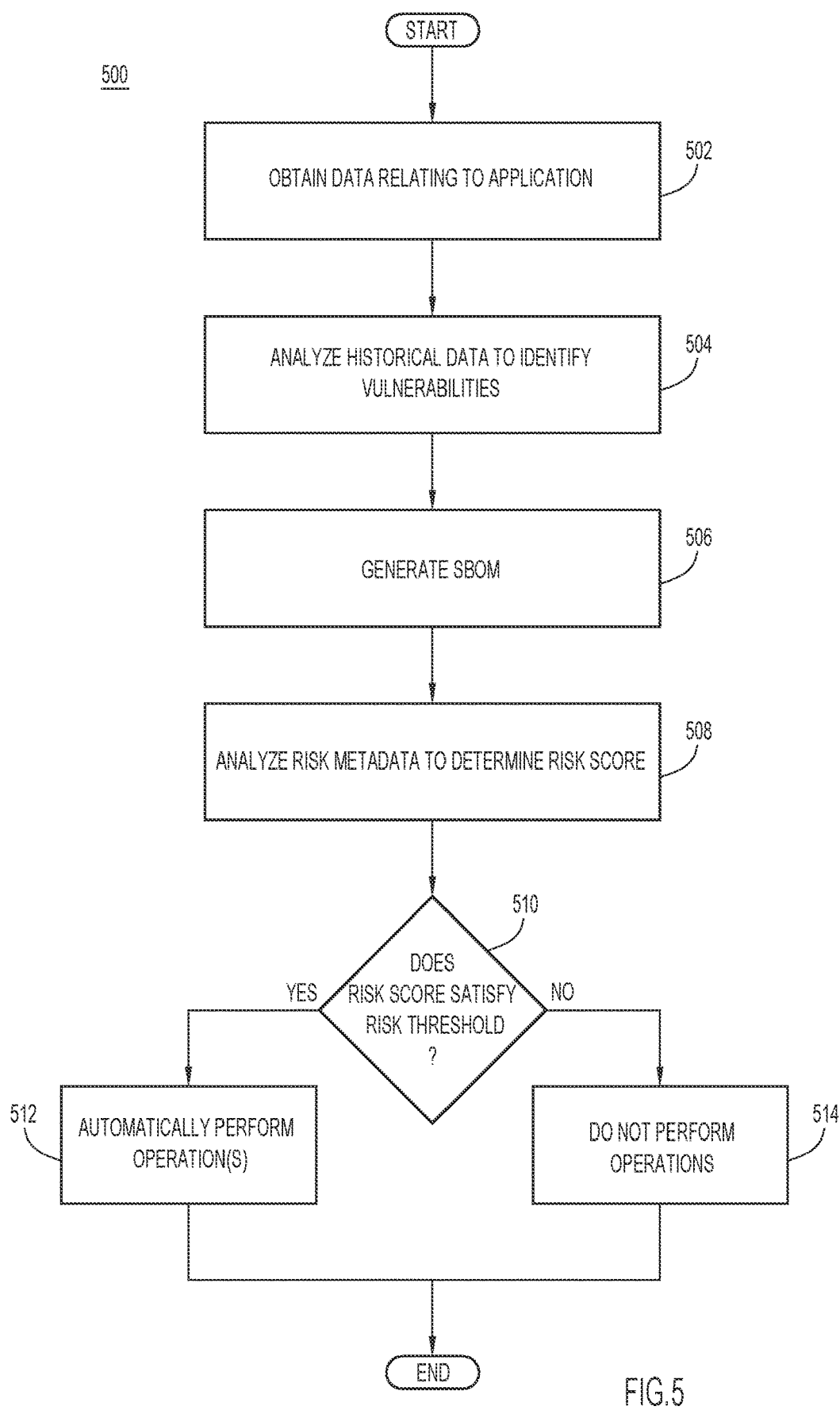
FIG. 5 is a flow chart of a method for analyzing a software application for risk, according to an example embodiment.

FIG. 5 is a flow chart of a method 500 for analyzing a software application for risk, according to an example embodiment.

Operation 502 involves obtaining data relating to an application. The data may include a listing of components of the application and/or any data descriptive of the history of an application with regard to prior version releases. The data can be obtained from a developer or publisher of the application or from other third-party sources.

Operation 504 involves analyzing the historical data to identify vulnerabilities. The data may be analyzed for each version of the application to identify vulnerabilities in each version and to extract other data, such as a number of vulnerabilities identified in a current version or one or more previous versions of the application, a severity of each vulnerability, a time spent remediating each vulnerability (or average time spent per vulnerability), a number of developers assigned to remediating past or present vulnerabilities, an open-source or closed-source nature of development of the application, and/or any other relevant additional data.

Operation 506 involves generating an SBOM. The SBOM may include a listing of all identified components of the application, and can include risk metadata that is descriptive of any identified vulnerabilities in the application, including previous versions of the application. The risk metadata may also include other extracted data regarding risk, such as the severity of vulnerabilities, time spent remediating vulnerabilities, number of developers assigned to remediating vulnerabilities, and/or open-source or closed-source nature of development of the application.

Operation 508 involves analyzing risk metadata associated with the SBOM to determine a risk score. A rules-based or machine learning approach may analyze the historical data to compute a risk score of the application that is reflective of the application's risk in terms of the history of the application across previous versions of the applications. The risk score can then be compared to a threshold value at operation 510 to determine whether the application satisfies the risk score. If the application indeed satisfies the risk score, then one or more operations may automatically be performed at operation 512, including notifying a user, causing the application to be installed to one or more computing devices, and the like. Otherwise, these operations are not performed at operation 514, and optionally, other operations can instead be performed, such as notifying a user that the application represents an unacceptable level of risk or automatically uninstalling the application from one or more computing devices.

Figure 6:
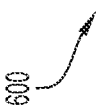
FIG. 6 is a block diagram of a device that may be configured to perform operations relating to software risk assessment, as presented herein.

Referring now to FIG. 6, FIG. 6 illustrates a hardware block diagram of a computing device 600 that may perform functions associated with operations discussed herein in connection with the techniques depicted in FIGS. 1-5. In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O 614 allows for input and output of data and/or information with other entities that may be connected to computing device 600. For example, I/O 614 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: obtaining data indicating one or more components of an application and historical data relating to one or more previous versions of the application; analyzing the historical data to identify one or more vulnerabilities present in the one or more previous versions of the application; generating a software bill of materials for the application based on the one or more components of the application, wherein the software bill of materials includes risk metadata descriptive of the one or more vulnerabilities of the application; and analyzing the risk metadata associated with the software bill of materials to determine a risk score for the application.

In some aspects, the techniques described herein relate to a computer-implemented method, further including: in response to determining that the risk score of the application satisfies a risk threshold, performing one or more of: automatically notifying a user that the application satisfies the risk threshold, and automatically installing the application at a computing device.

In some aspects, the techniques described herein relate to a computer-implemented method, wherein the risk metadata includes one or more of: a count of the one or more vulnerabilities, a severity of the one or more vulnerabilities, a time between identifying and remediating the one or more vulnerabilities, a number of developers assigned to remediating past or present vulnerabilities in the application, and an open-source or closed-source status of the application.

In some aspects, the techniques described herein relate to a computer-implemented method, further including: presenting via a user interface the risk score of the application.

In some aspects, the techniques described herein relate to a computer-implemented method, wherein the user interface further includes a plurality of applications and corresponding risk scores for each of the plurality of applications.

In some aspects, the techniques described herein relate to a computer-implemented method, wherein the plurality of applications are ranked according to the risk score of each application.

In some aspects, the techniques described herein relate to a computer-implemented method, further including: selecting for installation a particular application of the plurality of applications based on the risk score of each application.

In some aspects, the techniques described herein relate to a computer-implemented method, wherein the one or more vulnerabilities are identified in a common vulnerabilities and exposures listing.

In some aspects, the techniques described herein relate to a system including: one or more computer processors; one or more computer readable storage media; and program instructions stored on the one or more computer readable storage media for execution by at least one of the one or more computer processors, the program instructions including instructions to: obtain data indicating one or more components of an application and historical data relating to one or more previous versions of the application; analyze the historical data to identify one or more vulnerabilities present in the one or more previous versions of the application; generate a software bill of materials for the application based on the one or more components of the application, wherein the software bill of materials includes risk metadata descriptive of the one or more vulnerabilities of the application; and analyze the risk metadata associated with the software bill of materials to determine a risk score for the application.

In some aspects, the techniques described herein relate to a system, wherein the program instructions further include instructions to: in response to determining that the risk score of the application satisfies a risk threshold, perform one or more of: automatically notifying a user that the application satisfies the risk threshold, and automatically installing the application at a computing device.

In some aspects, the techniques described herein relate to a system, wherein the risk metadata includes one or more of: a count of the one or more vulnerabilities, a severity of the one or more vulnerabilities, a time between identifying and remediating the one or more vulnerabilities, a number of developers assigned to remediating past or present vulnerabilities in the application, and an open-source or closed-source status of the application.

In some aspects, the techniques described herein relate to a system, wherein the program instructions further include instructions to: present via a user interface the risk score of the application.

In some aspects, the techniques described herein relate to a system, wherein the user interface further includes a plurality of applications and corresponding risk scores for each of the plurality of applications.

In some aspects, the techniques described herein relate to a system, wherein the plurality of applications are ranked according to the risk score of each application.

In some aspects, the techniques described herein relate to a system, wherein the program instructions further include instructions to: select for installation a particular application of the plurality of applications based on the risk score of each application.

In some aspects, the techniques described herein relate to a system, wherein the one or more vulnerabilities are identified in a common vulnerabilities and exposures listing.

In some aspects, the techniques described herein relate to one or more non-transitory computer readable storage media having program instructions embodied therewith, the program instructions executable by a computer to cause the computer to perform operations including: obtaining data indicating one or more components of an application and historical data relating to one or more previous versions of the application; analyzing the historical data to identify one or more vulnerabilities present in the one or more previous versions of the application; generating a software bill of materials for the application based on the one or more components of the application, wherein the software bill of materials includes risk metadata descriptive of the one or more vulnerabilities of the application; and analyzing the risk metadata associated with the software bill of materials to determine a risk score for the application.

In some aspects, the techniques described herein relate to one or more non-transitory computer readable storage media, wherein the program instructions further cause the computer to: in response to determining that the risk score of the application satisfies a risk threshold, perform one or more of: automatically notifying a user that the application satisfies the risk threshold, and automatically installing the application at a computing device.

In some aspects, the techniques described herein relate to one or more non-transitory computer readable storage media, wherein the risk metadata includes one or more of: a count of the one or more vulnerabilities, a severity of the one or more vulnerabilities, a time between identifying and remediating the one or more vulnerabilities, a number of developers assigned to remediating past or present vulnerabilities in the application, and an open-source or closed-source status of the application.

In some aspects, the techniques described herein relate to one or more non-transitory computer readable storage media, wherein the program instructions further include instructions to: present via a user interface the risk score of the application.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A computer-implemented method comprising:

obtaining data indicating one or more components of an application and historical data relating to one or more previous versions of the application;

analyzing the historical data to identify one or more vulnerabilities present in the one or more previous versions of the application;

generating a software bill of materials for the application based on the one or more components of the application, wherein the software bill of materials includes risk metadata descriptive of the one or more vulnerabilities of the application; and analyzing the risk metadata associated with the software bill of materials to determine a risk score for the application.

2. The computer-implemented method of claim 1, further comprising:

in response to determining that the risk score of the application satisfies a risk threshold, performing one or more of: automatically notifying a user that the application satisfies the risk threshold, and automatically installing the application at a computing device.

3. The computer-implemented method of claim 1, wherein the risk metadata includes one or more of: a count of the one or more vulnerabilities, a severity of the one or more vulnerabilities, a time between identifying and remediating the one or more vulnerabilities, a number of developers assigned to remediating past or present vulnerabilities in the application, and an open-source or closed-source status of the application.

4. The computer-implemented method of claim 1, further comprising:

presenting via a user interface the risk score of the application.

5. The computer-implemented method of claim 4, wherein the user interface further includes a plurality of applications and corresponding risk scores for each of the plurality of applications.

6. The computer-implemented method of claim 5, wherein the plurality of applications are ranked according to the risk score of each application.

7. The computer-implemented method of claim 6, further comprising:

selecting for installation a particular application of the plurality of applications based on the risk score of each application.

8. The computer-implemented method of claim 1, wherein the one or more vulnerabilities are identified in a common vulnerabilities and exposures listing.

9. A system comprising:

one or more computer processors;

one or more computer readable storage media; and program instructions stored on the one or more computer readable storage media for execution by at least one of the one or more computer processors, the program instructions comprising instructions to:

obtain data indicating one or more components of an application and historical data relating to one or more previous versions of the application;

analyze the historical data to identify one or more vulnerabilities present in the one or more previous versions of the application;

generate a software bill of materials for the application based on the one or more components of the application, wherein the software bill of materials includes risk metadata descriptive of the one or more vulnerabilities of the application; and analyze the risk metadata associated with the software bill of materials to determine a risk score for the application.

10. The system of claim 9, wherein the program instructions further comprise instructions to:

in response to determining that the risk score of the application satisfies a risk threshold, perform one or more of: automatically notifying a user that the application satisfies the risk threshold, and automatically installing the application at a computing device.

11. The system of claim 9, wherein the risk metadata includes one or more of: a count of the one or more vulnerabilities, a severity of the one or more vulnerabilities, a time between identifying and remediating the one or more vulnerabilities, a number of developers assigned to remediating past or present vulnerabilities in the application, and an open-source or closed-source status of the application.

12. The system of claim 9, wherein the program instructions further comprise instructions to:

present via a user interface the risk score of the application.

13. The system of claim 12, wherein the user interface further includes a plurality of applications and corresponding risk scores for each of the plurality of applications.

14. The system of claim 13, wherein the plurality of applications are ranked according to the risk score of each application.

15. The system of claim 14, wherein the program instructions further comprise instructions to:

select for installation a particular application of the plurality of applications based on the risk score of each application.

16. The system of claim 9, wherein the one or more vulnerabilities are identified in a common vulnerabilities and exposures listing.

17. One or more non-transitory computer readable storage media having program instructions embodied therewith, the program instructions executable by a computer to cause the computer to perform operations including:

obtaining data indicating one or more components of an application and historical data relating to one or more previous versions of the application;

analyzing the historical data to identify one or more vulnerabilities present in the one or more previous versions of the application;

generating a software bill of materials for the application based on the one or more components of the application, wherein the software bill of materials includes risk metadata descriptive of the one or more vulnerabilities of the application; and analyzing the risk metadata associated with the software bill of materials to determine a risk score for the application.

18. The one or more non-transitory computer readable storage media of claim 17, wherein the program instructions further cause the computer to:

in response to determining that the risk score of the application satisfies a risk threshold, perform one or more of: automatically notifying a user that the application satisfies the risk threshold, and automatically installing the application at a computing device.

19. The one or more non-transitory computer readable storage media of claim 17, wherein the risk metadata includes one or more of: a count of the one or more vulnerabilities, a severity of the one or more vulnerabilities, a time between identifying and remediating the one or more vulnerabilities, a number of developers assigned to remediating past or present vulnerabilities in the application, and an open-source or closed-source status of the application.

20. The one or more non-transitory computer readable storage media of claim 17, wherein the program instructions further comprise instructions to:

present via a user interface the risk score of the application.

* * * * *